United States Patent [19]
Ogawa et al.

[11] Patent Number: 6,093,351
[45] Date of Patent: Jul. 25, 2000

[54] SEAT WITH SURFACE MATERIAL HAVING MULTILAYER HAVING DIFFERENT HARDNESS AND METHOD FOR MANUFACTURING THE SAME

[76] Inventors: Taro Ogawa, 3-52, Kojima Ajinokami 1-chome, Kurashiki-city, Okayama Prefecture 711; Fumio Goto, 829-4, Kushida, Kurashiki-city Okayama Prefecture 710-01, both of Japan

[21] Appl. No.: 08/894,266

[22] PCT Filed: Oct. 21, 1996

[86] PCT No.: PCT/JP96/03046

§ 371 Date: Jul. 30, 1997

§ 102(e) Date: Jul. 30, 1997

[87] PCT Pub. No.: WO97/20669

PCT Pub. Date: Jun. 12, 1997

[30] Foreign Application Priority Data

Dec. 5, 1995 [JP] Japan .................................. 7-339895

[51] Int. Cl.⁷ .................................................. B29C 67/00
[52] U.S. Cl. ...................... 264/46.4; 264/46.6; 264/46.8; 297/DIG. 1; 297/DIG. 2
[58] Field of Search .................. 297/452.27, 452.25, 297/452.58, 452.61, DIG. 1, DIG. 2; 264/45.1, 40.3, 46.6, 46.8, 46.4

[56] References Cited

U.S. PATENT DOCUMENTS

| | | |
|---|---|---|
| 4,699,427 | 10/1987 | Kobayashi . |
| 4,837,881 | 6/1989 | Kondo et al. . |
| 5,016,941 | 5/1991 | Yokota . |
| 5,252,373 | 10/1993 | Ganske et al. . |
| 5,389,318 | 2/1995 | Thary ..................................... 264/46.5 |

FOREIGN PATENT DOCUMENTS

| | | | |
|---|---|---|---|
| 56-110594 | 7/1981 | Japan .............................. | B29D 27/04 |
| 61-144337 | 7/1986 | Japan . | |
| 63-84906 | 4/1988 | Japan . | |
| 5-8234 | 1/1993 | Japan . | |
| 2 048 161 | 4/1980 | United Kingdom ........... | B29D 27/04 |
| PCT/BE91/ 00081 | 11/1991 | WIPO ............................. | B29C 67/22 |

OTHER PUBLICATIONS

European Patent Application No. 96935385, Supplementary European Search Report dated Nov. 4, 1998.

*Primary Examiner*—Milton Nelson, Jr.
*Attorney, Agent, or Firm*—Renner, Kenner, Greive, Bobak, Taylor & Weber

[57] ABSTRACT

A seat avoiding crumples of a surface material covering a cushioning body thereof, giving a comfortable soft feeling for a person who sits thereon and having such a hardness that a weight of the person can be supported. A seat (1) comprising a surface material (2) and a cushioning body having a shape corresponding to an outline of the seat. The cushioning body composing of a first cushioning body (6) integrated in one with at least a part of the surface material and a second cushioning body (10) underlying the first cushioning body.

31 Claims, 7 Drawing Sheets

SEAT WITH SURFACE MATERIAL HAVING MULTILAYER HAVING DIFFERENT HARDNESS AND METHOD FOR MANUFACTURING THE SAME

TECHNICAL FIELD

The present invention relates to a seat typically used for a car and also relates to a seat used for an industrial vehicle such as a forklift, a tractor and the like and a seat of a chair used in an office or as a furniture. In particular, the present invention relates to a seat in which a surface material is integrated in one with a cushioning body thereof.

BACKGROUND OF THE ART

Figure 7:
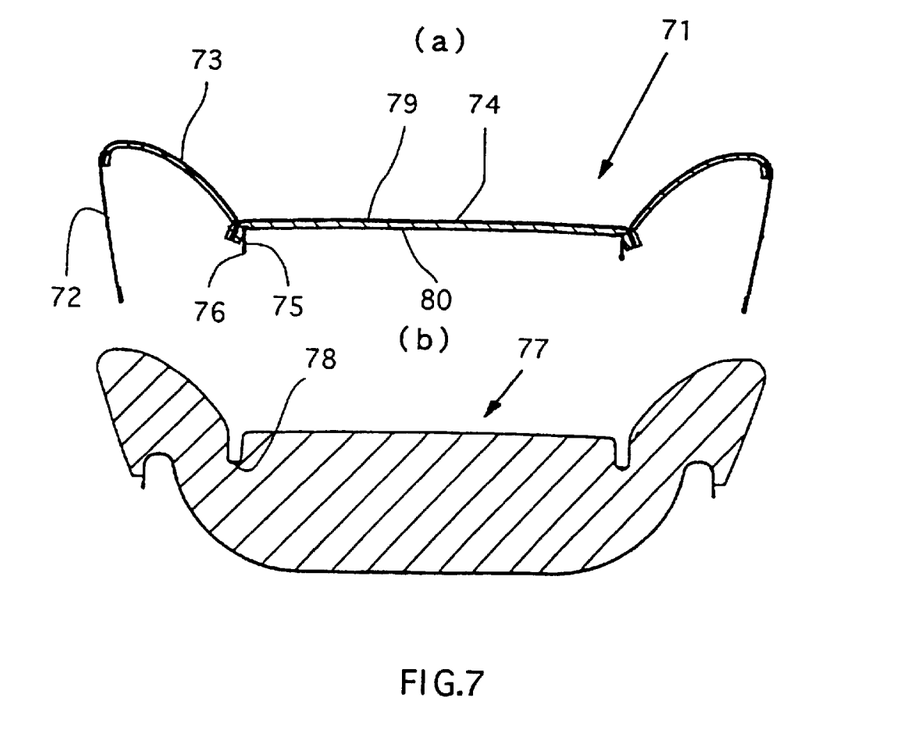
FIG. 7a is a cross sectional view of a surface material used for a seat of the art.
FIG. 7b is a cross sectional view of a cushioning body used for the seat of the art.

FIG. 7 shows a seat as typically used for a car composing a surface material 71 and a cushioning body 77 in accordance with the art. The surface material 71 composes a side surface member 72, a circumferential surface member 73 and a central surface member 74, and the side surface member 72, the circumferential surface member 73 and the central surface member 74 are corresponding to a side portion, a circumferential portion and a central portion of the seat, respectively. Each member of the surface material 71 is cut from a flat sheet material, and the surface material 71 is formed by stitching those members 72, 73, 74 so that a shape of the surface material 71 can be corresponding to a three dimensional shape of the seat.

The cushioning body 77 is covered with the surface material 71 having the same outline as the cushioning body 77. Then, the surface material 71 is connected with the cushioning body 77 by connecting a wire 78, which is provided in a gap formed in the cushioning body 77, and another wire 76, which is provided with a band cloth 75 stitched with the central surface member 74 and the circumferential surface member 73, through a hog-ring so that the surface material 71 can not be floated. The seat of the art is assembled in accordance with a manner as mentioned in the above.

It takes much time to cut a sheet material into those members of the surface material. Recently, a shape of a surface material used for a seat has been complicated, and in order to form such a surface material, the sheet material must be cut into members of the surface material having several shapes. Also, it is not suitable for mass production to connect the surface material 71 and the cushioning body 77 by use of the hog-ring, because workers must pay much time to assemble the surface material 71 and the cushioning body 77 in a work shop for carrying out such an assembling line work without a break.

In addition, when a person sits on the seat, the surface material is tensioned by a weight of the person. In the art, several textile materials typically used for the surface material can not be restored to an original state thereof when the person is away from the seat. Thus, the surface material is crumpled, and an external view as a quality of the seat is injured thereby.

In order to solve those problems, in a conventional technique, as shown in FIG. 7, a slab material 79 of an urethane foam having an excellent resiliency is bonded on a back surface of the surface material, and a thin textile material 80 is bonded on another surface of the urethane foam, in order to enhance resilient characteristics of the surface material.

However, it takes much time to fabricate such a surface material, and as a result, the surface material is expensive.

Also, for a seat used for a vehicle and a chair used in an office or as a furniture and the like (hereinafter simply written by a seat), in general, a resiliency is required to make a person comfortable when the person sits on the seat, and an appropriate hardness is also required to support a weight of the person.

In addition, in order to improve a shape-maintainability of the seat and an external view as a quality of the seat, it is desired to harden a side portion of the cushioning body of the seat.

However, in the seat composed and manufactured by according to the art, it is difficult to freely and partially control the hardness of the cushioning body thereof.

Therefore, an object of the present invention is to provide a seat wherein a surface material of the seat is integrated in one with a cushioning body thereof and a method for manufacturing such a seat.

Another object of the present invention is to provide a seat comprising a cushioning body composing of an upper layer and a lower layer wherein the upper layer which contacts with a person through a surface material is appropriately soft and the lower layer for supporting a weight of the person is appropriately hard, and is to provide a method for manufacturing such a seat.

Still another object of the present invention is to provide a seat comprising a cushioning body composing of an upper layer and a lower layer wherein a hardness of the upper layer is partially different, and is to provide a method for manufacturing such a seat.

Yet another object of the present invention is to provide a seat composing a surface material and a cushioning body integrated in one with the surface material wherein a constitution of the surface material is simplified, and is to provided a method for manufacturing such a seat.

DISCLOSURE OF THE INVENTION

In order to achieve those objects, a seat according to the present invention comprises a surface material and a cushioning body which has a shape generally corresponding to an outline of the seat and is covered with the surface material, and the cushioning body is composed of a first cushioning body and a second cushioning body which underlies as a base of the cushioning body. The first cushioning body is integrated in one with the second cushioning body, so that the first cushioning body can be underlain by the second cushioning body, by introducing a liquid foamable mixture for forming the first cushioning body on the second cushioning body and then integrally pressurizing the liquid foamable mixture together with the surface material positioned thereon when a gas reaction of the liquid foamable mixture has been completed but the liquid foamable mixture is still in an elastic flowing condition so that the first cushioning body can be integrated in one with the surface material through a back surface thereof and also integrated in one with the second cushioning body through an upper surface thereof.

The hardness of the first cushioning body can be partially controlled by adjusting a compressibility when the gas reaction has been completed but the liquid foamable mixture is still in an elastic flowing condition.

A method according to the present invention for manufacturing a seat comprising a surface material and a cushioning body integrated in one with the surface material, wherein the cushioning body has a shape generally corresponding to an outline of the seat and is composed of a first cushioning body and a second cushioning body which underlies the first cushioning body, comprises steps of:

introducing a liquid foamable mixture for forming the first cushioning body on a surface of the second cushioning body;

facing at least a part of a back surface of the surface material to the liquid foamable mixture introduced on the surface of the second cushioning body; and pressurizing and compressing the liquid foamable mixture, which is introduced on the surface of the second cushioning body, together with the surface material between a pressure applying mold having a shape of a central portion of the seat and positioned above the surface material and the second cushioning body when a gas reaction of the liquid foamable mixture has been completed but the liquid foamable mixture is still in an elastic flowing condition.

In the step of facing, it is desirable that the liquid foamable mixture introduced on the surface of the second cushioning body places between the surface material and the second cushioning body so that the second cushioning body can be covered with the surface material.

An alternative method according to the present invention for manufacturing a seat comprising a surface material and a cushioning body integrated in one with the surface material, wherein the cushioning body has a shape generally corresponding to an outline of the seat and is composed of a first cushioning body and a second cushioning body which underlies the first cushioning body, comprises steps of:

introducing a liquid foamable mixture for forming the first cushioning body on a surface of the second cushioning body;

positioning a central surface portion of the surface material in a pressure applying mold which has a shape corresponding to a shape of a central portion of the seat and is positioned on the second cushioning material;

facing the central surface portion positioned in the pressure applying mold to the liquid foamable mixture introduced on the surface of the second cushioning body; and pressurizing and compressing the liquid foamable mixture, which is introduced on the surface of the second cushioning body, between the pressure applying mold positioned the surface material and the second cushioning body when a gas reaction of the liquid foamable mixture has been completed but the liquid foamable mixture is still in an elastic flowing condition.

An another alternative method according to the present invention for manufacturing a seat comprising a surface material and a cushioning body integrated in one with the surface material, wherein the cushioning body has a shape generally corresponding to an outline of the seat and is composed of a first cushioning body and a second cushioning body which underlies the first cushioning body, comprises steps of:

introducing a liquid foamable mixture for forming the first cushioning body on a surface of the second cushioning body;

positioning a central surface portion of the surface material in a pressure applying mold, which has at least one suction hole and has a shape corresponding to a shape of a central portion of the seat, by sucking the central surface portion through the suction hole;

facing the central surface portion positioned and sucked in the pressure applying mold to the liquid foamable mixture introduced on the surface of the second cushioning body; and pressurizing and compressing the liquid foamable mixture introduced on the surface of the second cushioning body between the pressure applying mold positioned and sucked the surface material and the second cushioning body when a gas reaction of the liquid foamable mixture has been completed but the liquid foamable mixture is still in an elastic flowing condition.

It is desirable that the hardness of the first cushioning body is partially controlled by adjusting a compressibility applied for the liquid foamable mixture when the gas reaction of the liquid foamable mixture has been completed but the liquid foamable mixture is still in an elastic flowing condition. It is desirable that the compressibility is adjusted by partially adjusting a space defined between the pressure applying mold and the second cushioning body, and such a partial adjustment can be achieved by introducing the liquid foamable mixture on the second cushioning body so that a thickness of a layer formed by introducing the liquid foamable mixture can be the same over the second cushioning body and then pressurizing and compressing the layer.

It is desirable that the first and second cushioning bodies are molded from a reactive foamable resin of a polyurethane foam or a polyurea foam.

It is desirable that the surface material is composed of a central surface portion and a side surface portion successively connected with the central surface portion, and the central surface portion is integrated in one with the first cushioning body and the side surface portion covers sides of the second cushioning body.

The hardness of the first cushioning body can be different from that of the second cushioning body in accordance with the purpose of use of a seat.

A textile material of a woven fabric or a knitted fabric, a leather, a synthetic leather or a PVC leather can be used for the surface material, and it is desirable to provide a slab material of an urethane foam or a plastic film on a back surface of the surface material. Also, it is desirable to provide a plastic film on a back surface of the sheet material of the slab urethane foam provided on the back surface of the surface material.

A seat according to the present invention is formed of a surface material integrated in one with a cushioning body, and thereby the surface material can be restored into the original state by the resiliency of the cushioning body when a weight of a person who sits on the seat is released.

Moreover, the surface material is integrated in one with the first cushioning body having a shape corresponding to an outline of the seat, and thereby it is unnecessary to cut and stitch so that a shape of the surface material can be corresponding to an outline of the seat.

Furthermore, a hardness of the first cushioning body can be partially controlled by adjusting a space defined between the pressure applying mold and the second cushioning body and then by pressurizing and compressing. The holdability of the seat can be improved by hardening a circumferential portion of the seat so that a main portion of the seat can be soft.

Also, a hardness of the second cushioning body is selectable independent of that of the first cushioning body so that such a hardness that a weight of a person who sits thereon can be supported can be given to the second cushioning body.

BEST MODE FOR CARRYING OUT THE INVENTION

With referring to drawings, embodiments of the present invention are described.

Figure 1:
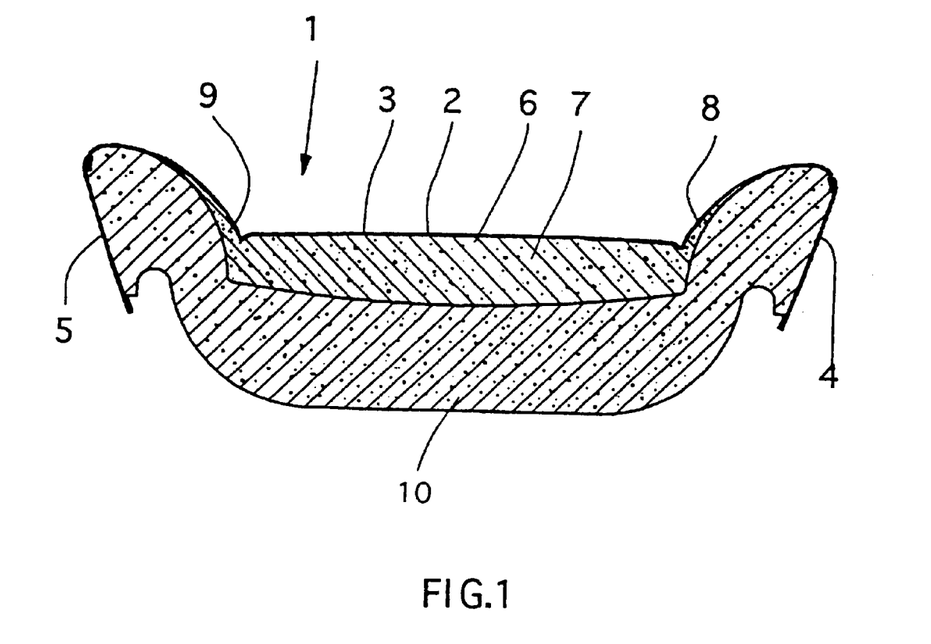
FIG. 1 is a cross sectional view of a seat according to the present invention.

FIG. 1 is a cross sectional view of a seat manufactured by a method according to the present invention. The seat 1 is composed of a surface material 2, a first cushioning body 6 as an upper layer and a second cushioning body 10 as a lower layer which underlies the first cushioning body 6. An outline of the seat is defined by all of those components.

The surface material 2 is composed of a central surface portion 3 (which forms a central portion of the seat), side surface portions 4, 5 continued from sides of the central surface portion and covering the second cushioning body 10. As described in the followings, the central surface portion 3 is integrated in one with the first cushioning body 6 through a back surface thereof, and the first cushioning body is integrated in one with the second cushioning body 10.

The surface material 2 can be composed by stitching members corresponding to the central surface portion 3 and the side surface portions 4, 5, separately cut from a sheet material as mentioned in the seat shown in FIG. 1. Alternatively, only one member corresponding to the portions 3, 4, 5 can be used as the surface material 2.

A material used for the surface material 2 is not limited, and the surface material 2 may be a textile material of a woven fabric, a knitted fabric and the like, or a synthetic leather, a leather or a PVC leather, used for a surface material of a seat in general.

The first cushioning body 6 is formed of a central body portion 7 and circumferential body portions 8, 9 continued to both sides of the first cushioning body 6. The central body portion 7 has a generally uniform thickness and the circumferential body portions 8, 9 have a gradually thinned thickness.

The first cushioning body 6 is formed of a foamed body such as a polyurethane foam which is typically used as a foamed body. Alternatively, the first cushioning body 6 can be formed of a reactive foamable resin such as a polyurea foam and the like.

While a hardness of the first cushioning body 6 can be uniform over the first cushioning body 6, it is more desirable that the circumferential body portions 8, 9 are hardened more than that of the central body portion by according to a method for manufacturing the first cushioning body 6 as mentioned in the followings, so that a holdability to a person who sits the seat can be improved and an outline of the seat can be maintained.

The second cushioning body 10 as a base of the seat has a shape generally corresponding to a shape of the seat and is integrated in one with the first cushioning body 6 by according to a method mentioned in the followings so that the first cushioning body 6 can be underlain by the second cushioning body 10.

As well as the first cushioning body 6, the second cushioning body 10 is formed of a foamed body of a polyurethane foam, or a reactive foamable resin such as a polyurea foam or the like.

It is desirable that the first cushioning body 6 is soft and the second cushioning body 10 is hard, so that the first cushioning body 6 can give a comfortable feeling for a person who sits on a seat and so that the second cushioning body 10 can support a weight of the person, can improve the holdability and can maintain an outline of the seat. Alternatively, if the cushionability is required for the seat, the hardness of the second cushioning body can be reduced to be soft.

We now consider a method for manufacturing a seat according to the present invention.

Figure 2:
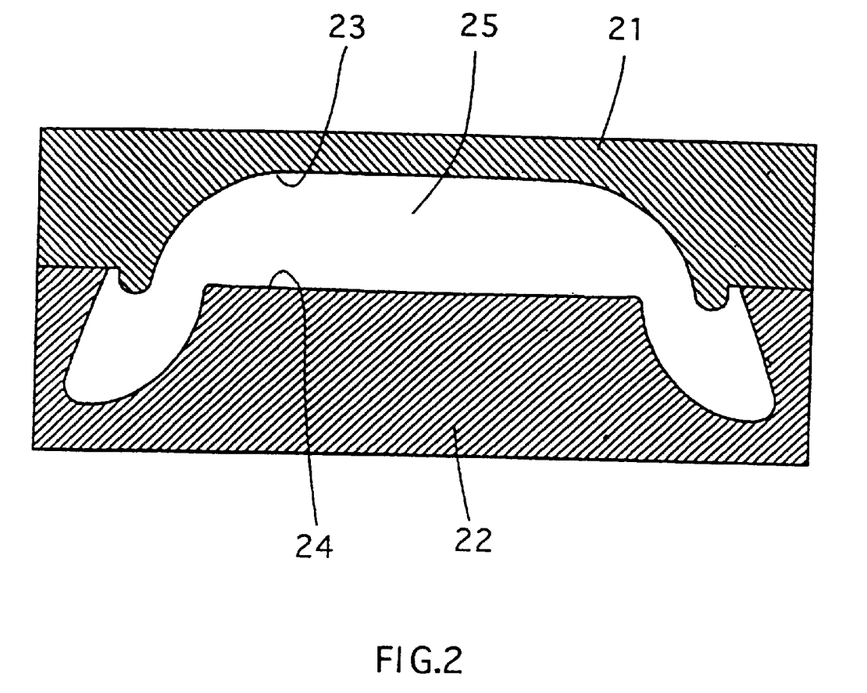
FIG. 2 is a cross sectional view of a mold composing an upper and a lower molds for molding a second cushioning body.

The second body 10 as a base of the seat can be molded by according to a conventional method. Firstly, means (herein called as a foaming mold) for molding the second cushioning body 10 are provided and comprise an upper mold 21 and a lower mold 22 as shown in FIG. 2. An inner surface 23 of the upper mold 21 has a shape corresponding to a bottom shape of the second cushioning body 10, and an inner surface 24 of the lower mold 22 has preferably a flat surface or a central convex portion to form the first cushioning body 6 on the second cushioning body 10. When the upper mold 21 and the lower mold 22 are closed, a shape of a space 25 defined between those molds 21, 22 is corresponding to a three dimensional shape of the second cushioning body 10.

Figure 3:
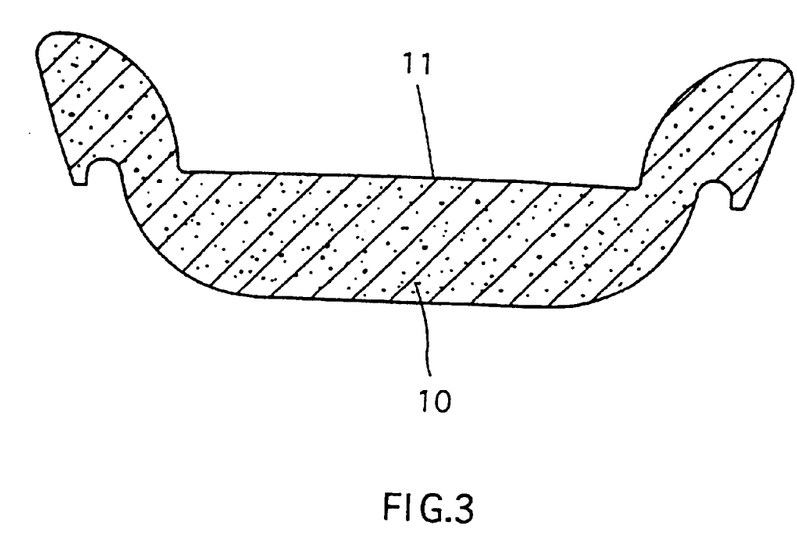
FIG. 3 is a cross sectional view of a second cushioning body molded by using a mold shown in FIG. 2.

A liquid foamable mixture of a polyurethane foam is introduced in the lower mold 22. Then, the upper mold 21 and the lower mold 22 are closed, and the second cushioning body 10 is molded by foaming and molding the mixture between them, as shown in FIG. 3. The second cushioning body 10 is used as a lower mold, as formed the first cushioning body 6 on the second cushioning body 10 by using means of an upper and a lower molds, as described in the followings.

Figure 4:
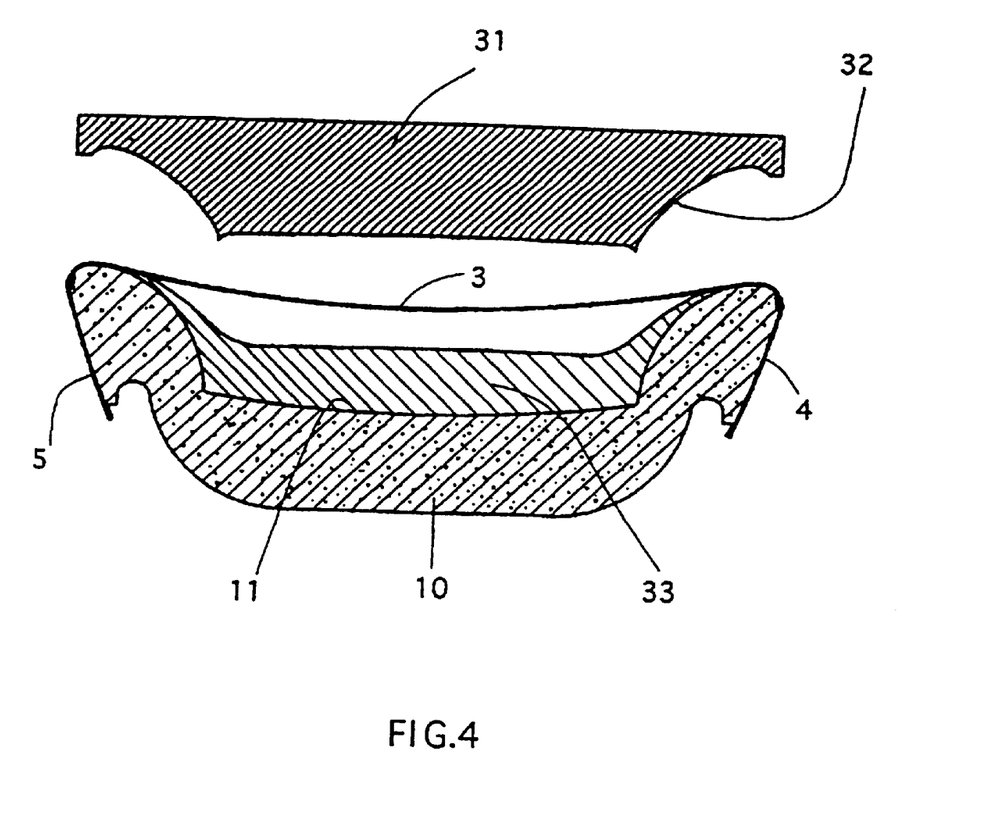
FIG. 4 is a cross sectional view of an arrangement of a pressure applying mold, a surface material, a mixture and a second cushioning body in order to mold a first cushioning body in accordance with a method of the present invention.

One embodiment of a method according to the present invention for molding the first cushioning body is shown in FIG. 4.

An upper mold (hereinafter written by a pressure applying mold) 31 for applying a pressure is positioned above the second cushioning body 10 formed by according to the technique mentioned in the above. A three dimensional shape of the first cushioning body 6 is defined between an lower surface (hereinafter written by a pressure applying surface) 32 of the pressure applying mold 31 and an upper surface 11 (which is formed by the inner surface 34 of the lower mold 22) of the second cushioning body 10.

Then, as shown in FIG. 4, a liquid foamable mixture 33 of a polyurethane foam is introduced to form a layer of the liquid foamable mixture 33 on a whole area of the upper surface 11 of the second cushioning body 10. The liquid foamable mixture 33 can be introduced by using means for spraying the mixture thereon.

While a liquid mixture of a reactive foamable resin of a polyurethane foam is used in this embodiment, a liquid mixture of a reactive foamable resin of a polyurea foam can be used.

Meanwhile, a surface material 2 composing a central surface portion 3 and side surface portions 4, 5 successively connected with both sides of the central surface portion 3 by stitching those portions 3, 4, 5 is disposed in such an arrangement that the central surface portion 3 is positioned on the liquid mixture 33 formed as a layer on the upper surface 11 and the side surface portions 4, 5 are positioned on both sides of the second cushioning body 10. The central surface portion 3 of the surface material 2 is adjusted to the pressure applying surface 32 of the pressure applying mold 31.

Then, the pressure applying mold 31 is lifted down, and then, the liquid foamable mixture 33 of a polyurethane foam is integrally pressurized and compressed together with the surface material 2 between the pressure applying mold 31 and the second cushioning body 10. When this, a gas reaction of the liquid mixture has been completed but the liquid mixture is still in an elastic flowing condition during a reaction thereof.

In general, by reacting a reactive foamable mixture of a polyurethane foam, a polyurea foam and the like, a stable foamed body having excellent resilient characteristics can be molded. This foamed body is not easily deformed even though the foamed body is pressurized and compressed.

However, the mixture is unstable during the reaction and is still in an elastic flowing condition for a certain period after completing a gas reaction so that the mixture can be easily deformed by applying an external force. Thus, if the mixture is integrally pressurized together with a second foamed body or a textile material when the mixture is in the elastic flowing condition, this second foamed body or this material is fixed on a foamed body of the mixture by entering the mixture in the second foamed body or in a part of the textile material, and as a result, the foamed body of the mixture is integrated in one with the second foamed body or the textile material. In addition, a compressibility to the mixture can be controlled, and thus, the resulting foamed body is harder as the compressibility is higher and the resulting foamed body is softer as the compressibility is lower.

Therefore, the first cushioning body having a desired resiliency is formed by transforming the liquid foamable mixture 33 into a solid body, and a back surface of the surface material 2 is fixed on an upper side of the first cushioning body and the second cushioning body 10 is fixed on a lower side the first cushioning body so that the first cushioning body can be integrated in one with the surface material and the second cushioning body. In accordance with the method described in the above, the seat according to the present invention is manufactured.

As mentioned in the above, the central surface portion of the surface material 2 is adjusted to the pressure applying surface 32. Thus, the second cushioning body is hardly deformed during the mixture is pressurized and compressed, and the first cushioning body having a desired shape can be molded thereby.

In the embodiment shown in FIG. 4, the liquid foamable mixture is introduced on the upper surface II of the second cushioning body 10 to form such a layer of the mixture that a part of the layer corresponding to the circumferential body portions of the seat is thin and a part of the layer corresponding to the central body portion thereof is thick, so that the resulting first cushioning body can be soft and can have generally the same hardness over the first cushioning body.

Alternatively, if the liquid foamable mixture 33 is introduced on the upper surface 11 of the second cushioning body 10 so that a thickness of a layer formed by introducing the liquid mixture 33 on the upper surface 11 can be the same over the upper surface 11, the compressibility of a part of the layer corresponding to the circumferential body portion of the seat is higher than that of a part of the layer corresponding to the central body portion thereof, and the circumferential body portions of the seat can be harder than the central body portion of the seat thereby.

Figure 5:
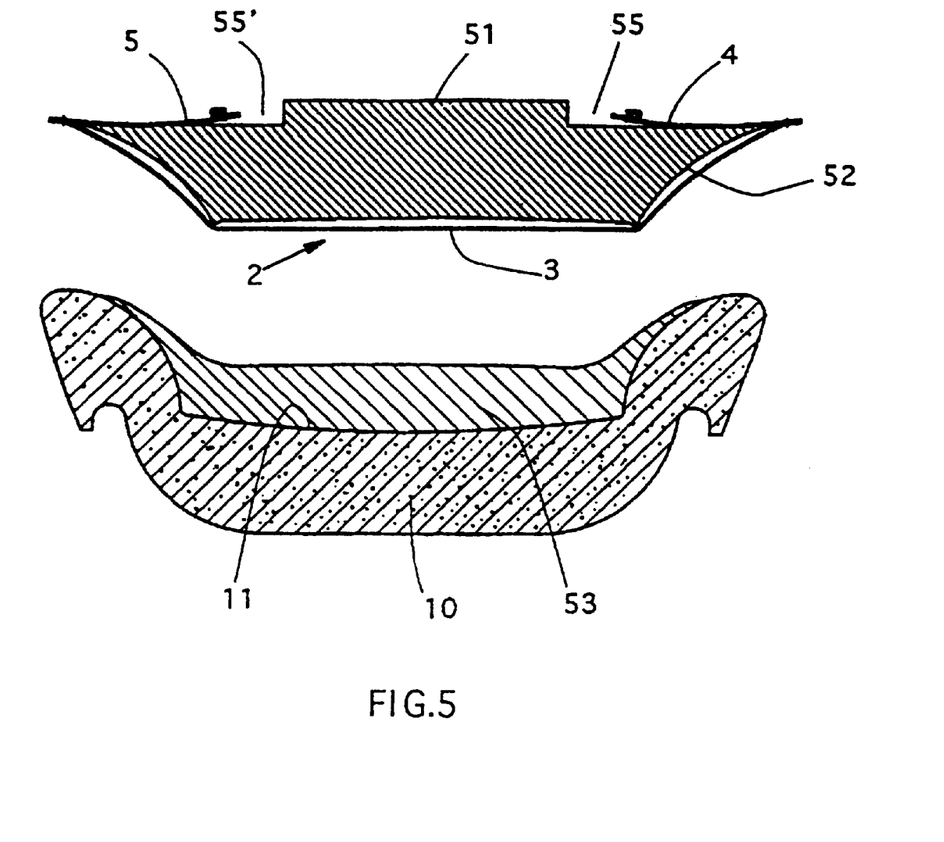
FIG. 5 is a cross sectional view of an arrangement of a pressure applying mold having step portions, a surface material, a mixture and a second cushioning body in order to mold a first cushioning body in accordance with an alternative method of the present invention.

FIG. 5 shows an embodiment of an alternative method for manufacturing a seat in accordance with the present invention.

As well as in FIG. 4, a pressure applying mold 51 is positioned above the second cushioning body 10. A three dimensional shape of the first cushioning body 6 is defined by a pressure applying surface 52 of the pressure applying mold 51 and the upper surface 11 (which is a surface formed by the inner surface 34 of the lower mold 22) of the second cushioning body 10, as well as the pressure applying surface 32 of the pressure applying mold 31. As a difference between the pressure applying molds 51 and 31, step portions 55, 55' are formed on an upper surface of the pressure applying mold 51 so that those step portions 55, 55' are symmetrically provided thereon to set the side surface portion of the surface material 2.

The surface material 2 is positioned on the pressure applying mold 51. When this, the central surface portion 3 is positioned on the pressure applying surface 52 of the pressure applying mold 51 and the side surface portions 4, 5 stitched with the central surface portion 3 are positioned on the step portions 55, 55'.

Then, as shown in FIG. 5, a layer of a liquid foamable mixture 53 is formed over a whole of the upper surface 11 of the second cushioning body 10, as well as the embodiment shown in FIG. 4.

Then, the pressure applying mold 51 is lifted down, and the liquid foamable mixture 53 is pressurized and compressed together with the surface material 2 between the pressure applying mold 51 and the second cushioning body 10 when a gas reaction of the liquid foamable mixture has been completed but the liquid foamable mixture is still in an elastic flowing condition. Then, the liquid foamable mixture 53 is transformed into a solid body so that the first cushioning body can be formed, and as a result, a back surface of the surface material 2 is fixed on an upper side of the first cushioning body and the second cushioning body 10 is fixed on a lower side of the first cushioning body so that the first cushioning body can be integrated in one with the surface material 2 and the second cushioning body 10. Then, side surfaces of the second cushioning body 10 are covered with the side surface portions. Thus, a seat according to the present invention is manufactured.

Figure 6:
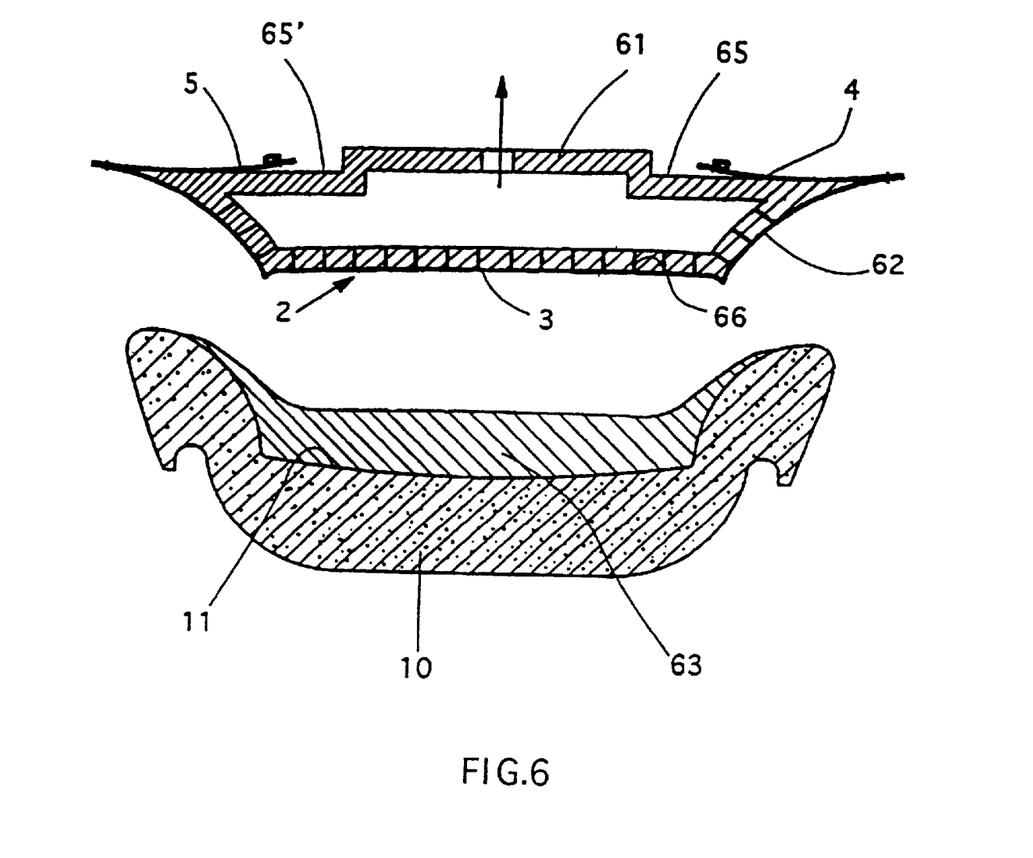
FIG. 6 is a cross sectional view of an arrangement of a pressure applying mold having suction holes, a surface material, a mixture and a second cushioning body in order to mold a first cushioning body in accordance with an another alternative method of the present invention.

FIG. 6 shows an embodiment of an another alternative method for manufacturing a seat in accordance with the present invention.

A pressure applying mold 61 shown in FIG. 6 has basically the same outline of the pressure applying mold 51 shown in FIG. 5 and has a plurality of suction holes 66 provided on a pressure applying surface 66. The suction holes 66 are connected with an external vacuum pump system (not shown ) to suck the surface material on the pressure applying surface 62.

In this manufacturing method, firstly, the central surface portion 3 is positioned on the pressure applying surface 62 of the pressure applying mold 62 and the side surface portions 4, 5 stitched with the central surface portion 3 are positioned on step portions 65, 65', and the surface material 2 is positioned on the pressure applying mold 61 by driving the external vacuum pump system to suck the central surface portion 3 on the pressure applying surface 62. Such a suction is useful for positioning the surface material on the pressure applying surface, in particular, when the surface material is thick or a size of the pressure applying mold is large so that the surface material can not be positioned along the pressure applying surface. It is desirable that a plastic film is attached on a back surface of the surface material to sufficiently carry out such a suction.

Then, as shown in FIG. 6, a layer of a liquid foamable mixture 63 is formed over a whole of the upper surface 11 of the second cushioning body 10, as well as the embodiment shown in FIG. 5.

Then, the pressure applying mold 61 is lifted down, and the liquid foamable mixture 63 is pressurized and compressed together with the surface material 2 between the pressure applying mold 61 and the second cushioning body 10 when a gas reaction of the liquid foamable mixture has been completed but the liquid foamable mixture is still in an elastic flowing condition. Then, the liquid foamable mixture 63 is transformed into a solid body so that the first cushioning body can be formed, and as a result, a back surface of the surface material 2 is fixed on an upper side of the first cushioning body and the second cushioning body 10 is fixed on a lower side of the first cushioning body so that the first cushioning body can be integrated in one with the surface material 2 and the second cushioning body 10. Then, side surfaces of the second cushioning body 10 are covered with the side surface portions. Thus, a seat according to the present invention is manufactured.

In the embodiments shown in FIGS. 5 and 6, a hardness of the first cushioning body can be partially controlled by adjusting a compressibility, as described in the embodiment shown in FIG. 4. While the surface material is composed by stitching the side surface portions in those embodiments, a surface material which is united a central surface portion with side surface portions can be used. In addition, the surface material is not limited in a single material. That is, if necessary, a composite material which attaches a slab urethane foam on a back surface thereof can be used as the surface material. If the slab urethane foam is attached on the back surface of the surface material, the liquid foamable mixture is not penetrate a textile material of the surface material when the liquid foamable mixture is pressurized and compressed. Also, if a plastic film is attached on the back surface of the surface material, the liquid foamable mixture is not penetrate a textile material of the surface material when the liquid foamable mixture is pressurized and compressed. Also, a plastic film can be attached on a back surface of the slab urethane foam attached on the back surface of the surface material.

In a seat according to the present invention, a surface material thereof is integrated in one with a cushioning body so that the seat can be soft and resilient, and thereby the seat can give a comfortable feeling for a person who sits thereon. While the surface material is tensioned by a weight of a person who sits on the seat, the surface material is restored into an original state thereof by the resiliency even though the weight of the person is released, and the surface material can not be crumpled thereby.

If circumferential and side portions of the seat are harder than a central portion of the seat, a shape of the seat can be maintained and the holdability of the seat can be improved without giving an uncomfortable feeling for a person who sits on the seat.

The cushioning body of the seat comprises an upper layer and a lower layer, and the upper layer is integrated in one with the lower layer so that the upper layer can be underlain by the lower layer which does not directly contact with a person who sits on the seat. Thus, a weight of a person who sits on the seat can be supported and a shape of the seat can be maintained by hardening the lower layer without giving an uncomfortable feeling for the person.

Only one member as the surface material which contacts with a person who sits on the seat can be molded, so that it is unnecessary to cut into several members of the surface material, and parts and materials of the seat can be simplified thereby, and the manufacturing process is also simplified so that the manufacturing cost can be reduced.

Because each cushioning body is united with each other, an assembling work for connecting each cushioning body is eliminated, and a work for manufacturing a seat can be reduced thereby.

What is claimed is:

1. A method for manufacturing a seat comprising a surface material and a cushioning body integrated in one with said surface material, wherein said cushioning body has a shape generally corresponding to an outline of the seat and is composed of a first cushioning body and a second cushioning body which underlies said first cushioning body, comprises steps of:

introducing a liquid foamable mixture for forming said first cushioning body on a surface of the second cushioning body;

facing at least a part of a back surface of said surface material to said liquid foamable mixture introduced on said surface of said second cushioning body; and pressurizing and compressing said liquid foamable mixture, which is introduced on said surface of said second cushioning body, together with said surface material between said second cushioning body and a pressure applying mold having a shape corresponding to a shape of a central portion of said seat and positioned above the surface material, when a gas reaction of said liquid foamable mixture has been completed but said liquid foamable mixture is still in an elastic flowing condition.

2. A method of claim 1 wherein said step of facing is carried out by placing said liquid foamable mixture, which is introduced on said surface of said second cushioning body, between said surface material and said second cushioning body so that said second cushioning, body can be covered with said surface material, and wherein said surface material comprises a central surface portion and side surface portions continued from said central surface portion, said central surface portion being integrated in one with said first cushioning body, sides of said second cushioning body being covered with said side surface portions.

3. A method of claim 1, wherein said surface material comprises a central surface portion and side surface portions continued from said central surface portion, said central surface portion being integrated in one with said first cushioning body, sides of said second cushioning body being covered with said side surface portions.

4. A method of claim 1, wherein a hardness of said first cushioning body is different from a hardness of said second cushioning body.

5. A method of claim 1 wherein said first and second cushioning bodies are molded of a reactive foamable resin.

6. A method of claim 1, wherein said step of pressurizing and compressing includes a step of partially adjusting a compressibility applied for said liquid foamable mixture when said gas reaction has been completed but said liquid foamable mixture is still in said elastic flowing condition, to partially control a hardness of said first cushioning body.

7. A method of claim 6 wherein said step of partially adjusting said compressibility comprises steps of:
- partially adjusting a space defined between said pressure applying mold and said second cushioning body;
- introducing said liquid foamable mixture on said second cushioning body so that a thickness of a layer formed by introducing said liquid foamable mixture can be the same over said second cushioning body; and
- pressurizing and compressing said layer.

8. A method of claim 1 wherein said surface material is selected from the group consisting of a textile material of a woven fabric, a knitted fabric, a leather, a synthetic leather and a PVC leather.

9. A method of claim 8 wherein a slab material of a slab urethane foam is provided on a back surface of said surface material.

10. A method of claim 8 wherein a plastic film is provided on a back surface of said surface material.

11. A method of claim 8 wherein a slab material of a slab urethane foam is provided on a back surface of said surface material and a plastic film is provided on a back surface of said slab urethane foam.

12. A method for manufacturing a seat comprising a surface material and a cushioning body integrated in one with said surface material, wherein said cushioning body has a shape generally corresponding to an outline of said seat and is composed of a first cushioning body and a second cushioning body which underlies said first cushioning body, comprises steps of:
- introducing a liquid foamable mixture for forming said first cushioning body on a surface of said second cushioning body;
- positioning a central surface portion of said surface material in a pressure applying mold which has a shape corresponding to a shape of a central portion of said seat and is positioned on said second cushioning material;
- facing said central surface portion positioned in said pressure applying mold to said liquid foamable mixture introduced on said surface of said second cushioning body; and
- pressurizing and compressing said liquid foamable mixture, which is introduced on said surface of said second cushioning body, between said second cushioning body and said pressure applying mold which positions said surface material, when a gas reaction of said liquid foamable mixture has been completed but said liquid foamable mixture is still in an elastic flowing condition.

13. A method of claim 12 wherein said surface material comprises a central surface portion and side surface portions continued from said central surface portion, said central surface portion being integrated in one with said first cushioning body, sides of said second cushioning body being covered with said side surface portions.

14. A method of claim 12 wherein a hardness of said first cushioning body is different from a hardness of said second cushioning body.

15. A method of claim 12 wherein said first and second cushioning bodies are molded of a reactive foamable resin.

16. A method of claim 12 wherein said step of pressurizing and compressing includes a step of partially adjusting a compressibility applied for said liquid foamable mixture when said gas reaction has been completed but said liquid foamable mixture is still in said elastic flowing condition, to partially control a hardness of said first cushioning body.

17. A method of claim 16 wherein said step of partially adjusting said compressibility comprises steps of:
- partially adjusting a space defined between said pressure applying mold and said second cushioning body;
- introducing said liquid foamable mixture on said second cushioning body so that a thickness of a layer formed by introducing said liquid foamable mixture can be the same over said second cushioning body; and
- pressurizing and compressing said layer.

18. A method of claim 12 wherein said surface material is selected from the group consisting of a textile material of a woven fabric, a knitted fabric, a leather, a synthetic leather and a PVC leather.

19. A method of claim 18 wherein a slab material of a slab urethane foam is provided on a back surface of said surface material.

20. A method of claim 18 wherein a plastic film is provided on a back surface of said surface material.

21. A method of claim 18 wherein a slab material of a slab urethane foam is provided on a back surface of said surface material and a plastic film is provided on a back surface of said slab urethane foam.

22. A method for manufacturing a seat comprising a surface material and a cushioning body integrated in one with said surface material, wherein said cushioning body has a shape generally corresponding to an outline of the seat and is composed of a first cushioning body and a second cushioning body which underlies said first cushioning body, comprises steps of:
- introducing a liquid foamable mixture for forming said first cushioning body on a surface of said second cushioning body;
- positioning a central surface portion of said surface material in a pressure applying mold, which has at least one suction hole and has a shape corresponding to a shape of a central portion of said seat, by sucking said central surface portion through said suction hole;
- facing said central surface portion positioned and sucked in said pressure applying mold to said liquid foamable mixture introduced on said surface of said second cushioning body; and
- pressurizing and compressing said liquid foamable mixture introduced on said surface of said second cushioning body between said second cushioning body and said pressure applying mold which positions said surface material by sucking, when a gas reaction of said liquid foamable mixture has been completed but said liquid foamable mixture is still in an elastic flowing condition.

23. A method of claim 12 wherein said surface material comprises a central surface portion and side surface portions continued from said central surface portion, said central surface portion being integrated in one with said first cushioning body, sides of said second cushioning body being covered with said side surface portions.

24. A method of claim 12 wherein a hardness of said first cushioning body is different from a hardness of said second cushioning body.

25. A method of claim 22 wherein said first and second cushioning bodies are molded of a reactive foamable resin.

26. A method of claim 22 wherein said step of pressurizing and compressing includes a step of partially adjusting a compressibility applied for said liquid foamable mixture when said gas reaction has been completed but said liquid foamable mixture is still in said elastic flowing condition, to partially control a hardness of said first cushioning body.

27. A method of claim 26 wherein said step of partially adjusting said compressibility comprises steps of:

partially adjusting a space defined between said pressure applying mold and said second cushioning body;

introducing said liquid foamable mixture on said second cushioning body so that a thickness of a layer formed by introducing said liquid foamable mixture can be the same over said second cushioning body; and pressurizing and compressing said layer.

28. A method of claim 22 wherein said surface material is selected from the group consisting of a textile material of a woven fabric, a knitted fabric, a leather, a synthetic leather and a PVC leather.

29. A method of claim 28 wherein a slab material of a slab urethane foam is provided on a back surface of said surface material.

30. A method of claim 28 wherein a plastic film is provided on a back surface of said surface material.

31. A method of claim 28 wherein a slab material of a slab urethane foam is provided on a back surface of said surface material and a plastic film is provided on a back surface of said slab urethane foam.

* * * * *

UNITED STATES PATENT AND TRADEMARK OFFICE
CERTIFICATE OF CORRECTION

PATENT NO.    : 6,093,351
DATED         : July 25, 2000
INVENTOR(S)   : Taro Ogawa and Fumio Goto It is certified that error appears in the above-identified patent and that said Letters Patent is hereby corrected as shown below:

Column 10,
Line 51, the comma between the words "cushioning" and "body" should be deleted; and Column 12,
Lines 59 and 65, the numeral "12", should be -- 22 --.

Signed and Sealed this

Sixteenth Day of November, 2004

JON W. DUDAS
*Director of the United States Patent and Trademark Office*